UNITED STATES PATENT OFFICE.

EDWARD D. HOUSTON, OF WORCESTER, MASSACHUSETTS, ASSIGNOR OF ONE-HALF TO JOHN W. KNIBBS, OF WORCESTER, MASSACHUSETTS.

SEASONING AND METHOD OF MAKING THE SAME.

970,712.　　　　Specification of Letters Patent.　　Patented Sept. 20, 1910.

No Drawing.　　Application filed April 7, 1910.　Serial No. 553,954.

*To all whom it may concern:*

Be it known that I, EDWARD D. HOUSTON, a citizen of the United States, residing at Worcester, in the county of Worcester and State of Massachusetts, have invented a new and useful Seasoning and Method of Making the Same, of which the following is a specification.

This invention relates to a seasoning for use with foods, and to a method of making the same.

The principal objects of the invention are to provide a palatable seasoning suitable for general use as a substitute for a natural flavor, but particularly on meats, which can be very cheaply and expeditiously manufactured, and can be put up or packed in small packages and used conveniently at the table, and which shall be of such a nature that it will keep for indefinite periods of time without deteriorating or losing its strength.

Broadly considered, the invention also involves the production of a new article of food particularly for seasoning purposes which will add materially to the economy of the table, because it will render foods palatable that ordinarily would not be, and because it will permit the use of a certain flavor at all seasons of the year and in places where the vegetable from which it is derived could not be readily transported.

Further objects and advantages of the invention will appear hereinafter.

Reduced to its simplest terms, the invention consists in the utilization of the ordinary onion for seasoning purposes in the manner above specified.

The invention although more suitable for the utilization of onions as aforesaid, is capable also of application to some other vegetables for the purpose of utilizing them in a similar way.

In its preferred form the method is carried out as follows:—A quantity of onions or other vegetables containing moisture, say for example, 100 lbs., are peeled sufficiently to expose their inner moist surfaces, and they may be cut up into pieces of any desired size. With these onions a quantity of common salt is mixed, preferably less than 50%, and in the example indicated, about 40 lbs. are ordinarily used. This salt is applied to the onions in any desired way as by sprinkling or pouring it over their surfaces, and it has been found in practice that the more of the exposed moist surfaces of the onions are covered by the salt the more rapid and thorough is the action hereinafter described. This mixture of the salt and onion preferably is accomplished by placing the onions or pieces thereof in layers in a receptacle and sprinkling the salt over each layer before the superposed layers are introduced. Almost as soon as the salt is applied to the moist surfaces of the onion a partial liquefaction takes place which causes a partial disintegration of the cell walls of the onion and liberates the air which is held by the porous structures of the onion. This produces numerous small bubbles, which taken together, appear in the form of a froth on the surface of the onion.

It is apparent that the liquefied salt attacks the solid portions of the vegetable as stated, but what further chemical action takes place, if any, I am not prepared to state. I have found however, that if the moisture or juice is extracted from the onion and mixed with the salt, no such effect is secured, except that of course the salt dissolves. After this action has commenced the whole mixture is run through a grinding machine or otherwise finely divided in any desired way and reduced to a pulp. I find that this above described action between the salt and onion continues during the grinding operation, and afterward, and that the pulp produced in this way is comparatively thin and creamy, the particles going through the grinder being very minute. In this way the salt attacks the smallest surface of the onion, and by the time a mass of the above described proportions is thoroughly ground the action of the salt on the onion is substantially complete, the formation of air bubbles ceases, and no further time need be allowed for this action. The next step is to place the mixture in a dry, warm place, and leave it for sufficient time to allow for evaporation. For a mixture, such as that described above, exposed in a suitable receptacle, placed on an ordinary steam radiator at a temperature of steam under a very low pressure, the evaporation requires about two days. I find that at this point a peculiar action takes place. It will be remembered that the particles of onion are extremely small. I have generally used a grinder from which no particle of pulp can emerge, that is above about one 16th of an inch in diameter. When the substance is evaporated as aforesaid it is found to form thin flakes, very often apparently consisting of a sheet of vegetable pulp of irregular size and shape but of approximately uniform thickness coated, chiefly on one side with crystallized salt. These flakes unite with each other in various forms, and form masses of from a quarter to a half inch across. They are quite light in weight and of a yellowish to light brown color, except where crystals of salt appear, when they are pure white. I assume from this that an excess of salt has been used, and that part of the salt not taken up by the vegetable pulp crystallizes out and appears on the surface thereof. This material can be used in this form as a seasoning for the purpose of mixing in soups and various other dishes. If it is desired, however, to use it on the table to place on meats and the like after they are prepared so that each individual may suit his own taste, these flaky masses are pulverized in any desired way and placed in an ordinary salt shaker or some such receptacle. I have found that in either form the material will keep its dry and granular condition for a long time, that it does not cake together in the salt shaker, and that the onion flavor, as well as the salt taste is preserved for long periods of time. This makes the seasoning a very convenient one to use, and extremely suitable for use on the table as well as for seasoning foods while they are being prepared. The resultant product is readily sub-divided into any desired quantities, can be transported to any distance and into any climate, can be kept until the particular vegetable of which it is made is out of season, and is made so inexpensively that it is within the reach of all. Also the flavor is such that it will add materially to the value of foods which are of a more or less tasteless character, thus permitting economy at table.

I do not wish to be limited to each particular step or order of steps, or to all the details of the product, which I have described, but What I do claim is:—

1. The method of making seasoning which consists in peeling a quantity of onions so as to expose the moist inner surfaces, adding thereto about 40% by weight of common salt in contact with said moist surfaces, permitting the salt to remain in contact with said surfaces until bubbles in the form of a froth appear thereon, grinding the mixture to a pulp, and drying in a warm place until the pulp forms into a mass consisting of dry flakes.

2. The method of making seasoning which consists in peeling a quantity of onions so as to expose the moist inner surfaces, adding thereto about 40% by weight of common salt in contact with said moist surfaces, permitting the salt to remain in contact with said surfaces until bubbles in the form of froth appear thereon, grinding the mixture to a pulp, drying in a warm place until the pulp forms into a mass consisting of dry flakes, with crystals of salt upon one side thereof, and pulverizing the same to produce a fine powder.

3. The method of making a seasoning which consists of peeling a quantity of onions so as to expose the moist inner surfaces, placing in contact with said moist surfaces a quantity of common salt, leaving the salt in contact with said surfaces until bubbles in the form of froth appear thereon, reducing the mixture to a pulp, drying until the pulp forms into a mass of dry flakes, and pulverizing the same to produce a fine powder.

4. As an article of manufacture, a seasoning consisting of onion with salt thereon in the form of masses of dry flakes, having onion pulp on one side and salt crystals on the other.

5. As an article of manufacture, a seasoning consisting of onion in the form of masses of dry flakes, having crystals of salt thereon.

In testimony whereof I have hereunto set my hand, in the presence of two subscribing witnesses.

EDWARD D. HOUSTON.

Witnesses:
ALBERT E. FAY,
C. FORREST WESSON.